United States Patent [19]

Arkens et al.

[11] Patent Number: 5,932,689

[45] Date of Patent: Aug. 3, 1999

[54] FORMALDHYDE-FREE COMPOSITIONS FOR NONWOVENS

[75] Inventors: Charles Thomas Arkens, Hatfield, Pa.; Johnny Chung Nin U, Valbonne, France

[73] Assignee: Rohm and Haas Company, Phila., Pa.

[21] Appl. No.: 09/064,473

[22] Filed: Apr. 22, 1998

[30] Foreign Application Priority Data

Apr. 25, 1997 [FR] France .................................. 97 05168

[51] Int. Cl.$^6$ .............................. C08G 69/00; C08F 8/00; C08L 77/00

[52] U.S. Cl. .......................... 528/335; 528/310; 528/322; 528/332; 528/336; 525/327.7; 525/329.6; 525/329.8; 525/340; 524/538; 524/559

[58] Field of Search ...................... 524/549, 559; 525/327.7, 329.6; 528/310, 322, 332, 335, 336

[56] References Cited

U.S. PATENT DOCUMENTS

| | | | |
|---|---|---|---|
| 5,143,582 | 9/1992 | Arkens et al. | 162/135 |
| 5,318,990 | 6/1994 | Strauss | 524/549 |
| 5,536,766 | 7/1996 | Seyffer et al. | 524/100 |
| 5,661,213 | 8/1997 | Arkens et al. | 524/555 |
| 5,718,728 | 2/1998 | Arkens et al. | 8/116.1 |
| 5,763,524 | 6/1998 | Arkens et al. | 524/549 |

*Primary Examiner*—P. Hampton-Hightower

*Attorney, Agent, or Firm*—Kevin F. Gironda, Patent Agent

[57] ABSTRACT

A formaldehyde-free curable composition useful for binding nonwovens comprises (a) a polyacid comprising at least two carboxylic acid groups, anhydride groups, or salts of the polyacid thereof;

(b) an active hydrogen compound containing at least two active hydrogen groups selected from the group consisting of hydroxyl, primary amino, secondary amino, and mixtures thereof; and (c) one or more compounds selected from the group consisting of cyanamide, dicyandiamide, 1,2-mono- or di-($C_1$–$C_6$ alkyl) substituted-3-cyanoguanidines such as ethyl-3-cyanoguanidine, 1,2-diethyl-3-cyanoguanidine, and 1,2-diisopropyl-3-cyanoguanidine, and 1,2-mono- or di-($C_6$–$C_{12}$ aryl) substituted-3-cyanoguanidines, such as phenyl-dicyandiamide; and, optionally (d) an accelerator;

wherein the ratio of the number of equivalents of said carboxylic acid groups, anhydride groups, or salts thereof to the number of equivalents of said active hydrogen groups is from 1/0.01 to about 1/3, and wherein said carboxylic acid groups, anhydride groups, or salts thereof are neutralized to an extent of less than 35% by weight with a fixed base. The accelerator may be a phosphorus and/or fluoroborate compound.

The compositions enable manufacturing flexibility through lower curing temperatures.

8 Claims, No Drawings

FORMALDHYDE-FREE COMPOSITIONS FOR NONWOVENS

This invention concerns formaldehyde-free compositions for nonwovens. In particular, though not exclusively, the present invention concerns formaldehyde-free compositions suitable for bonding mineral or glass-fiber, heat-resistant non-wovens.

Glass fiber heat-resistant nonwovens are composed of fibers which may be consolidated by purely mechanical means such as, for example, treatment with a polymeric binder; or by a combination of mechanical and chemical means before, during, or after nonwoven fabric formation. The polymeric binder is frequently cross-linked by reaction with formaldehyde producing resins. However, in some countries there is current legislation which limits formaldehyde emissions as well as proposed legislation which may further limit or eliminate formaldehyde emissions, and in other countries growing environmental pressures are such that similar legislation is envisaged in the near future. Accordingly, there is a continued and growing need for compositions which do not emit formaldehyde upon crosslinking.

A number of compositions for nonwovens which do not emit formaldehyde upon crosslinking have been disclosed in the prior art.

U.S. Pat. No. 5,318,990 and EP-A-0583086 disclose formaldehyde-free compositions, based on combinations of polyacids and polyols, which can be used as binders for heat-resistant nonwovens. Such compositions essentially rely, however, on the presence of a phosphorus accelerator to ensure effective cure.

EP-A-0672720 discloses formaldehyde-free binders, impregnants or coating compositions which are described as being useful for binding glass fiber, mineral fiber or polyester fiber nonwovens. The compositions are based upon A) a polymer derived from 2 to 100 wt % of an ethylenically unsaturated acid or acid anhydride, and B) a polyol selected from certain triazine derivatives, triazinetrione derivatives or benzene or cyclohexyl derivatives. Though such compositions do not essentially require the presence of an accelerator to effect cure, they do tend to require relatively high temperatures to effect crosslinking, thereby limiting the flexibility of the manufacturing process and so increase manufacturing costs.

It is an object of the present invention to provide formaldehyde-free compositions which can be used as binders, impregnants or coating compositions for nonwovens but which do not essentially require the presence of an accelerator and can be crosslinked at relatively lower temperatures than, for example, those disclosed in EP-A-0672720.

In accordance with the present invention, there is provided a formaldehyde-free curable composition comprising:

(a) a polyacid comprising at least two carboxylic acid groups, anhydride groups, or salts of the polyacid thereof;

(b) an active hydrogen compound containing at least two active hydrogen groups selected from the group consisting of hydroxyl, primary amino, secondary amino, and mixtures thereof; and (c) one or more compounds selected from the group consisting of cyanamide, dicyandiamide, 1,2-mono- or di-($C_1$–$C_6$ alkyl) substituted-3-cyanoguanidines such as ethyl-3-cyanoguanidine, 1,2-diethyl-3-cyanoguanidine, and 1,2-diisopropyl-3-cyanoguanidine, and 1,2-mono- or di-(C6–C12 aryl) substituted-3-cyanoguanidines, such as phenyldicyandiamide. Preferably component (c) is cyanamide or dicyandiamide or a mixture therof, more preferably component (c) is dicyandiamide;

wherein the ratio of the number of equivalents of said carboxylic acid groups, anhydride groups, or salts thereof to the number of equivalents of said active hydrogen groups is from 1/0.01 to about 1/3, and wherein said carboxylic acid groups, anhydride groups, or salts thereof are neutralized to an extent of less than 35% by weight with a fixed base.

The compositions of the present invention have been found to cure adequately at temperatures significantly below certain compositions described in EP-A-0672720 and can be used as binders, impregnants and coating compositions for nonwovens. For example, it has been found that compositions of the present invention, when used as binders for glass fiber heat-resistant nonwovens, may be effectively cured at temperatures significantly below those temperatures required for effective cure of certain compositions of EP-A-0672720 without any significant detrimental effects on the binding properties in the nonwoven. Such a reduction in curing temperatures offers the manufacturer of glass fiber heat resistant nonwovens a more flexible manufacturing process and so the possibility of reducing manufacturing costs. For example, breakages of the nonwoven web are less likely to occur during manufacture when a lower crosslinking temperature binder is employed, so reducing the likelyhood of manufacturing stoppages.

In another aspect, the present invention provides a method for binding a heat-resistant nonwoven or heat-resistant fibers thereof comprising (I) contacting said nonwoven or fibers thereof with a curable composition as defined above, and (II) heating said curable composition at an elevated temperature, which temperature is sufficient to effect cure. Preferably, curing is effected at a temperature from 120° C. to 300° C. more preferably less than 200° C.

In yet another aspect, the present invention provides a nonwoven comprising a crosslinked composition obtained by curing a composition as defined above. Preferably, the nonwoven is heat-resistant and preferably comprises mineral or glass fibers.

Though an accelerator is not an essential component to obtain adequate crosslinking of the composition of the present invention, it has been found that the presence of an accelerator may offer other significant advantages such as an higher crosslinking density in the cured composition and a decrease in water sensitivity of the cured composition. Accordingly, in a particular embodiment of the present invention, there is provided a formaldehyde-free curable aqueous composition comprising:

(a) a polyacid comprising at least two carboxylic acid groups, anhydride groups, or salts of the polyacid thereof;

(b) an active hydrogen compound compound containing at least two active hydrogen groups selected from the group consisting of hydroxyl, primary amino, secondary amino, and mixtures thereof;

(c) one or more compounds selected from the group consisting of cyanamide, dicyandiamide, 1,2-mono- or di-($C_1$–$C_6$ alkyl) substituted-3 -cyanoguanidines such as ethyl-3-cyanoguanidine, 1,2-diethyl-3-cyanoguanidine, and 1,2-diisopropyl-3-cyanoguanidine, and 1,2-mono- or di-(C6–C12 aryl) substituted-3-cyanoguanidines, such as phenyldicyandiamide, preferably component (c) is cyanamide or dicyandiamide or a mixture therof, more preferably component (c) is dicyandiamide; and (d) an accelerater;

wherein the ratio of the number of equivalents of said carboxylic acid groups, anhydride groups, or salts thereof to the number of equivalents of said active hydrogen groups is from 1/0.01 to about 1/3, and wherein said carboxylic acid groups, anhydride groups, or salts thereof are neutralized to an extent of less than 35% by weight with a fixed base. Suitable accelerators are well known in the art but preferably the accelerator is a phosphorus or fluoroborate compound or a mixture thereof.

The composition of the present invention is preferably in the form of an aqueous composition comprising components (a), (b) and (c), and optionally (d), but, in another embodiment, it may also be in a solids form, such as a dry powder or granules, comprising the same components. A dry powder can be manufactured by spray drying the aqueous form, and other techniques for making powders can also be used.

The formaldehyde-free curable composition of this invention is a substantially thermoplastic, or substantially uncrosslinked composition when it is applied to the substrate, although low levels of deliberate or adventitious crosslinking may be present. On heating the binder, curing is effected either sequentially, after the binder is dried if it is in aqueous form, or concurrently, if the binder is in dry form. As used herein, curing is defined as a structural or morphological change which is sufficient to alter the properties of a flexible, porous substrate to which an effective amount of polymeric binder has been applied such as, for example, covalent chemical reaction, ionic interaction or clustering, improved adhesion to the substrate, phase transformation or inversion, and hydrogen bonding.

By "formaldehyde-free" is meant that the composition is substantially free from formaldehyde, and does not liberate substantial formaldehyde as a result of drying and/or curing. Typically, less than 1 part per million formaldehyde, based on the weight of the composition, is present in a formaldehyde-free composition. In order to minimize the formaldehyde content of the composition it is preferred, when preparing a polymer-containing formaldehyde-free curable composition, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of heat-resistant nonwovens.

The formaldehyde-free curable composition contains a polyacid. The polyacid must be sufficiently nonvolatile so that it will substantially remain available for reaction with compound (b) in the composition during heating and curing operations. When the polyacid is a compound with a molecular weight less than about 300, bearing at least two carboxylic acid groups, anhydride groups, or salts thereof, the polyacid typically is for example, citric acid, butane tricarboxylic acid, and cyclobutane tetracarboxylic acid. When the polyacid is a polymeric polyacid, the polyacid typically is, for example, a polyester containing at least two carboxylic acid groups and an addition polymer or oligomer containing at least two copolymerized carboxylic acid-functional monomers. The polymeric polyacid is preferably an addition polymer formed from at least one ethylenically unsaturated monomer. The addition polymer may be in the form of a solution of the addition polymer in an aqueous medium such as, for example, an alkali-soluble resin which has been solubilized in a basic medium; in the form of an aqueous dispersion such as, for example, an emulsion-polymerized dispersion; or in the form of an aqueous suspension. "Aqueous" herein includes water and mixtures composed substantially of water and water-miscible solvents.

The addition polymer must contain at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid, alpha, beta-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomer may include acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; and acrylonitrile or methacrylonitrile.

The addition polymer containing at least two carboxylic acid groups, anhydride groups, or salts thereof may have a molecular weight from about 300 to about 10,000,000. Preferred is a molecular weight from about 1000 to about 250,000. When the addition polymer is an alkali-soluble resin having a carboxylic acid, anhydride, or salt thereof, content of from about 5% to about 30%, by weight based on the total weight of the addition polymer, a molecular weight from about 7,000 to about 100,000 is preferred, higher molecular weight alkali-soluble resins leading to curable compositions which may exhibit excessive viscosity.

When the addition polymer is in the form of an aqueous dispersion or an aqueous suspension and low levels of precrosslinking or gel content are desired, low levels of multi-ethylenically unsaturated monomers such as, for example, allyl methacrylate, diallyl phthalate, 1,4-butylene glycol dimethacrylate, and 1,6-hexanedioldiacrylate, may be used at a level of from about 0.01% to about 5%, by weight based on the weight of the acrylic emulsion copolymer.

When the addition polymer is in the form of an aqueous dispersion the diameter of the addition polymer particles may be from about 80 nanometers to about 1000 nanometers, as measured using a Brookhaven BI-90 Particle Sizer, which employs a light scattering technique. However, polymodal particle size distributions such as those disclosed in U.S. Pat. Nos. 4,384,056 and 4,539,361, may be employed and are within the scope of the present invention.

When the addition polymer is in the form of an aqueous dispersion the addition polymer particles may be made up of two or more mutually incompatible copolymers. These mutually incompatible copolymers may be present in various morphological configurations such as, for example, core/shell particles, core/shell particles with shell phases incompletely encapsulating the core, core/shell particles with a multiplicity of cores, and interpenetrating network particles.

The addition polymer may be prepared by solution polymerization, emulsion polymerization, or suspension polymerization techniques for polymerizing ethylenically-unsaturated monomers, which are well known in the art. When it is desired to use emulsion polymerization, anionic or nonionic surfactants, or mixtures thereof, may be used. The polymerization may be carried out by various means such as, for example, with all of the monomer in the reaction kettle at the beginning of the polymerization reaction, with a portion of the monomer in emulsified form present in the reaction kettle at the beginning of the polymerization reaction, and with a small particle size emulsion polymer seed present in the reaction vessel at the beginning of the polymerization reaction.

The polymerization reaction to prepare the addition polymer may be initiated by various methods known in the art such as, for example, by using the thermal decomposition of an initiator and by using an oxidation-reduction reaction ("redox reaction") to generate free radicals to effect the polymerization. In another embodiment the addition polymer may be formed in the presence of phosphorous-containing chain transfer agents such as, for example, hypophosphorous acid and its salts, as is disclosed in U.S. Pat. No. 5,077,361, so as to incorporate the phosphorous-containing accelerator and the polyacid component in the same molecule.

Chain transfer agents such as mercaptans, polymercaptans, and halogen compounds may be used in the polymerization mixture in order to moderate the molecular weight of the acrylic emulsion copolymer. Generally, up to about 1% by weight, based on the weight of the polymeric binder, of ($C_4$–$C_{20}$) alkyl mercaptans, mercaptopropionic acid, or esters of mercaptopropionic acid may be used.

The carboxyl groups of the polyacid component of the formaldehyde-free curable aqueous composition are neutralized with fixed base to an extent of less than about 35%, calculated on an equivalents basis. Contacting the addition polymer component before, during, or after the preparation of the curable aqueous composition, the addition polymer containing two carboxylic acid groups, anhydride groups, or the salts thereof, defined as neutralization herein, with a fixed base is required prior to treating a nonwoven substrate. Neutralization of less than about 35% of the carboxylic acid groups, calculated on an equivalents basis, with a fixed base is required. Neutralization of less than about 20% of the carboxylic acid groups, calculated on an equivalents basis, with a fixed base is preferred. Neutralization of less than about 5% of the carboxylic acid groups, calculated on an equivalents basis, with a fixed base is more preferred. When the half ester of a dicarboxylic acid or the anhydride of a dicarboxylic acid is used, the equivalents of acid are calculated to be equal to those of the corresponding dicarboxylic acid.

"Fixed base", or "permanent base", as used herein, refers to a monovalent base which is substantially non-volatile under the conditions of the treatment such as, for example, sodium hydroxide, potassium hydroxide, sodium carbonate, or t-butylammonium hydroxide. The fixed base must be sufficiently nonvolatile that it will substantially remain in the composition during heating and curing operations. Volatile bases such as, for example, ammonia or volatile lower alkyl amines, do not function as the fixed base of this invention, but may be used in addition to the fixed base; they do not contribute to the required degree of neutralization by a fixed base. Fixed multivalent bases such as, for example, calcium carbonate may tend to destabilize an aqueous dispersion, if the addition polymer is used in the form of an aqueous dispersion, but may be used in minor amount.

The formaldehyde-free curable composition also contains an active hydrogen compound containing at least two active hydrogen groups selected from the group consisting of hydroxyl, primary amino, secondary amino, and mixtures thereof. The active hydrogen compound must be sufficiently nonvolatile that it will substantially remain available for reaction with the polyacid in the composition during heating and curing operations. The active hydrogen compound may be a compound with a molecular weight less than about 1,000, bearing at least two active hydrogen groups such as, for example, ethylene glycol, glycerol, pentaerythritol, trimethylol propane, sorbitol, sucrose, glucose, resorcinol, catechol, pyrogallol, glycolated ureas, 1,4-cyclohexane diol, monoethanolamine, diethanolamine, triethanolamine, and certain reactive polyols such as, for example, β-hydroxyalkylamides such as, for example, bis-[N,N-di(β-hydroxyethyl)]adipamide, as may be prepared according to the teachings of U.S. Pat. No. 4,076,917, hereby incorporated herein by reference, or it may be an addition polymer with a molecular weight greater than about 1,000 containing at least two active hydrogen groups such as, for example, polyvinyl alcohol, partially hydrolyzed polyvinyl acetate, and homopolymers or copolymers of hydroxyethyl (meth) acrylate, hydroxypropyl (meth)acrylate, dimethylaminoethyl methacrylate, and dimethylaminopropyl methacrylamide.

The ratio of the number of equivalents of carboxy, anhydride, or salts thereof of the polyacid to the number of equivalents of active hydrogen in the active hydrogen compound is from about 1/0.01 to about 1/3. An excess of equivalents of carboxy, anhydride, or salts thereof of the polyacid to the equivalents of active hydrogen in the active hydrogen compound is preferred. The more preferred ratio of the number of equivalents of carboxy, anhydride, or salts thereof in the polyacid to the number of equivalents of active hydrogen in the active hydrogen compound is from about 1/0.1 to about 1/1. The most preferred ratio of the number of equivalents of carboxy, anhydride, or salts thereof in the polyacid to the number of equivalents of active hydrogen in the active hydrogen compound is from about 1/0.2 to about 1/0.8.

The formaldehyde-free curable composition preferably contains about 10% by weight or less, more preferably less than about 10% but more than about 2% by weight, and most preferably from about 3% to about 8% by weight, based on the total weight of (a), (b) and (c), of one or more compounds selected from the group consisting of cyanamide, dicyandiamide, 1,2-mono- or di-($C_1$–$C_6$ alkyl) substituted-3-cyanoguanidines such as ethyl-3-cyanoguanidine, 1,2-diethyl-3-cyanoguanidine, and 1,2-diisopropyl-3-cyanoguanidine, and 1,2-mono- or di-(C6–C12 aryl) substituted-3-cyanoguanidines, such as phenyl-dicyandiamide. Preferably component (c) is cyanamide or dicyandiamide or a mixture therof, more preferably component (c) is dicyandiamide.

The formaldehyde-free curable composition may also contain an accelerater (d) which is preferably present in an amount of 10% or less, more preferably 0.01 to 10%, even more preferably 0.1% to 5%, and most preferably 0.5% to 2%, by weight based on the combined weight of the polyacid and the active hydrogen compound. Preferably, the accelerater is a phosphorus compound or a fluoroborate compound or a mixture of these compounds. Compound (d) may be, for example, hypophosphorous acid, sodium hypophosphite, sodium phosphite, potassium phosphite, disdodium pyrophosphate, tetrasodium pyrophosphate, sodium tripolyphosphate, potassium tripolyphosphate, potassium phosphate, fluoboric acid; an alkali metal fluoroborate salt such as sodium tetrafluoroborate or potassium tetrafluoroborate; a multi-valent metal fluoroborate salt such as calcium tetrafluoroborate, magnesium tetrafluoroborate, or zinc tetrafluoroborate; and ammonium tetrafluoroborate, or a mixture of two or more of these compounds.

The formaldehyde-free curable compositions may contain, in addition, conventional treatment components such as, for example, emulsifiers, pigments, fillers, antimigration aids, curing agents, coalescents, wetting agents, biocides, plasticizers, organosilanes, anti-foaming agents, colorants, waxes, and anti-oxidants.

The formaldehyde-free curable composition may be prepared by admixing compound (a), compound (b), and compound (c), and optional compound (d), using conventional mixing techniques.

As disclosed herein-above, the carboxyl groups of the polyacid may be neutralized to an extent of less than about 35% with a fixed base before, during, or after the mixing to provide the aqueous composition. Neutralization may be partially effected during the formation of the polyacid.

In one embodiment of this invention the formaldehyde-free curable composition may be used as a binder for heat-resistant nonwovens such as, for example, nonwovens which contain heat-resistant fibers such as, for example, aramid fibers, ceramic fibers, metal fibers, carbon fibers, polyimide fibers, certain polyester fibers, rayon fibers, and glass fibers. By "heat-resistant fibers" herein is meant fibers which are substantially unaffected by exposure to temperatures above about 120° C. Heat-resistant nonwovens may also contain fibers which are not in themselves heat-resistant such as, for example, certain polyester fibers, rayon fibers, nylon fibers, and superabsorbent fibers, in so far as they do not materially adversely affect the performance of the substrate.

The formaldehyde-free curable composition may be applied to nonwovens by conventional techniques such as, for example, air or airless spraying, padding, saturating, roll coating, curtain coating, beater deposition, and coagulation, or as a powder.

The aqueous formaldehyde-free composition, after it is applied to a nonwoven, is heated to effect drying and curing. The duration and temperature of heating will affect the rate of drying, processability and handleability, and property development of the treated substrate. Heat treatment at about 120° C. to about 300° C. for a period of time between about 3 seconds to about 15 minutes may be carried out; treatment at about 150° C. to about 200° C. is preferred. The drying and curing functions may be effected in two or more distinct steps, if desired. For example, the composition may be first heated at a temperature and for a time sufficient to substantially dry but not to substantially cure the composition and then heated for a second time at a higher temperature and/or for a longer period of time to effect curing. Such a procedure, referred to as "B-staging", may be used to provide binder-treated nonwoven, for example, in roll form, which may at a later stage be cured, with or without forming or molding into a particular configuration, concurrent with the curing process.

The heat-resistant nonwovens may be used for applications such as, for example, insulation batts or rolls, as reinforcing mat for roofing or flooring applications, as roving, as microglass-based substrate for printed circuit boards or battery separators, as filter stock, as tape stock, and as reinforcement scrim in cementitious and non-cementitious coatings for masonry.

The following examples are intended to illustrate the formaldehyde-free curable aqueous composition and the use thereof as a binder for heat-resistant nonwovens.

EXAMPLE 1

Preparation of Glass Fiber Handsheets and Saturation of Sheets with Binder Composition A 110 gallon (416.4 liter) tank equipped with an air-driven mixer was filled with deionized water. The pH of the water was adjusted to 9.0 with ammonium hydroxide. Fourteen ppm of Rhodameen VP-532 (Rhone-Poulenc) [a polyoxyethylated alkyl amine] and 31 ppm Magnifloc 1885A (Cytec Industries) [a polyacryamide], based on the weight of water, were added to the water. The solution was stirred for 15 minutes and then allowed to sit for 15 minutes. This solution is known as "white water". Five gallons of the white water was pumped into a six gallon stainless steel dispersion tank equipped with an air-driven mixer and four vertical baffles to provide more thorough mixing. The stirrer was turned on and 2.5 grams of ¼" (6.25 mm) length glass fibers was added. This formed a glass fiber dispersion. The glass fiber dispersion was then mixed for three minutes. Polyester scrim was placed on the bottom of a 12 inch by 12 inch (30 cm by 30 cm) square Williams sheet mold. The mold was closed and half filled with water. The stirrer in the dispersion tank was turned off. After 30 seconds, the valve on the dispersion tank was opened to drain the glass fiber dispersion into the sheet mold. Simultaneously, the drain valve on the sheet mold was opened, allowing fibers to form sheet on scrim. The sheet mold was opened and the scrim with the formed glass fiber sheet was lifted off and transferred to a screen stand. The excess water was vacuumed off with a large wet/dry vacuum cleaning device which was fitted with a 14 inch (35 cm) head. The binder composition was applied with a perforated funnel, maintaining a gentle flow so that the fibers were not disturbed. The excess binder composition was vacuumed off. After one stroke was made, the sheet was turned 90 degrees and another stroke was performed. This is called the treated glass fiber sheet. The treated glass fiber sheet was then transferred to another piece of scrim to prevent sticking to the first scrim. The glass fiber sheet was then dried and cured for three minutes at 190° C. in a high volume Werner-Mathis oven. The target loss on ignition was 22% and 0.5 lb/100 sq. ft. (25 g/m$^2$) basis weight.

EXAMPLE 2

Preparation of Binder Composition with 5% Dicydiamide

To 32.82 grams of polyacrylic acid (Mw=9,000) [Polyacid A] and 59.08 grams polyacrylic acid (60,000 Mw) [Polyacid B] was added 5.4 grams triethanolamine (TEA), 1.87 grams dicyandiamide (dicy), 18.33 grams (1.0%) Dow Corning silane [optional depending on glass fiber used] and 165.94 grams water. This mixture contains 13.0% active ingredients (all components other than water) with a pH about 3.0 and 10 cps viscosity (Brookfield LVF, #1 spindle at 60 rpm). The binder was applied as described in Example 1.

EXAMPLES 3–8

Preparation of Binder Compositions with Other Dicyandiamide Levels

Binder compositions with other dicyandiamide levels, including a dicyandiamide free system for comparison, were prepared according to ingredient levels shown in Table 1, which include dicyandiamide levels of 0, 2, 4, 6, 8 and 10% (Examples 3, 4, 5, 6, 7 and 8, respectively). Above 10% dicyandiamide, solubility becomes a limiting factor.

Examples 2–8 were tested for dry and wet tensile strength as follows: The cured sheet was cut into 1 inch (2.5 cm) by 4 inch (10 cm). Test specimens were tested for dry tensile strength by placing them in the jaws of a Thwing-Albert Intelect 500 tensile tester. Samples were pulled apart at a crosshead speed of 2 inches (5 cm)/minute. Wet tensile strength was measured by soaking a second set of identically prepared cured specimens. The samples were soaked in 85° C. water for one hour. The samples were removed from the water and tested immediately for tensile strength while still wet. The % retention, wet tensile strength/dry tensile strength×100, is then calculated. Since there is variability in handsheet separation, the % retention is particularly meaningful in assessing extent of strength development as related to the degree of crosslinking. Another desirable property is hot tensile strength, which is required for some operation. For this, test specimens were tested for tensile strength with an Instron tensile tester fitted with a heated chamber. Specimens were tested at 193° C. The % retention, hot tensile strength/dry (room temperature) tensile strength ×100, was also determined. Typical test results are shown in Table 2.

TABLE 1

| Example | Grams Polyacid A | Grams Polyacid B | Grams TEA | Grams dicy | Grams Z-6040 (1.0%) | Grams water |
|---|---|---|---|---|---|---|
| 3 | 32.82 | 59.08 | 5.4 | 0 | 17.86 | 147.91 |
| 4 | 32.82 | 59.08 | 5.4 | 0.71 | 17.36 | 153.02 |
| 5 | 32.52 | 59.08 | 5.4 | 1.45 | 18.13 | 163.38 |
| 6 | 32.52 | 59.08 | 5.4 | 2.27 | 18.53 | 168.37 |
| 7 | 32.52 | 59.08 | 5.4 | 3.09 | 18.93 | 173.36 |
| 8 | 32.52 | 59.08 | 5.4 | 3.95 | 19.35 | 178.60 |

TABLE 2

| | | Tensile Strength, N/5 cm | | | % Retention | |
|---|---|---|---|---|---|---|
| Example | % Dicy | Dry | Wet | Hot | Wet | Hot |
| 2 | 5 | 103 | 35 | 57 | 34.0 | 55.3 |
| 3 | 0 | 113 | 9 | 74 | 8.0 | 65.5 |
| 4 | 2 | 102 | 10 | 60 | 9.8 | 58.8 |
| 5 | 4 | 112 | 27 | 77 | 24.1 | 68.8 |
| 6 | 6 | 102 | 39 | 61 | 38.2 | 59.8 |
| 7 | 8 | 99 | 40 | 54 | 40.4 | 54.5 |
| 8 | 10 | 122 | 55 | 65 | 45.1 | 53.3 |

These examples show that increasing dicy level increases the wet retention.

EXAMPLES 9–13

Effect of an Accelerator with Dicyandiamide

The incorporation of an accelerator, such as sodium hypophosphite or sodium tetrafluoborate, improves the performance. Table 3 shows several dicy/accelerator variations. Each example uses 32.82 grams of Polyacid A and 59.08 grams Polyacid B, 5.4 grams triethanolamine, 0.5 available from Dow Corning % Z-6040 (3-glycidoxypropyltrimethoxysilane)(based on total active components) and water to give a final solids of 13.0%. Dicy and accelerator levels are shown in Table 3.

TABLE 3

| Example | Dicy, grams (%)* | Accelerator Type | Accelerator, grams (%)*/** |
|---|---|---|---|
| 9 | 0 (0) | SHP | 1.08 (2.5) |
| 10 | 1.87 (5.0) | SHP | 0.54 (1.25) |
| 11 | 1.87 (5.0) | TFB | 0.46 (1.25) |
| 12 | 1.87 (5.0) | SHP | 0.27 (0.61) |
| 13 | 1.87 (5.0) | TFB | 0.23 (0.61) |

*% of total active components
**Differences in SHP/TFB levels due to different purity.
SHP = Sodium hypophosphite
TFB = tetrafluoborate The typical test results of these systems are shown in Table 4.

TABLE 4

| | | Tensile Strength, N/5 cm | | | % Retention | |
|---|---|---|---|---|---|---|
| Example | Accelerator (%) | Dry | Wet | Hot | Wet | Hot |
| 9 | SHP (2.5) | 96 | 46 | 50 | 47.9 | 59.4 |
| 10 | SHP (1.25) | 90 | 65 | 66 | 72.2 | 73.3 |

TABLE 4-continued

| | | Tensile Strength, N/5 cm | | | % Retention | |
|---|---|---|---|---|---|---|
| Example | Accelerator (%) | Dry | Wet | Hot | Wet | Hot |
| 11 | TFB (1.25) | 100 | 72 | 69 | 72.0 | 69.0 |
| 12 | SHP (0.61) | 84 | 25 | 58 | 29.8 | 69.0 |
| 13 | TFB (0.61) | 99 | 66 | 62 | 66.6 | 62.6 |

EXAMPLE 14–17

Effect of Cure Temperature on Performance

Previous examples were cured at 190° C. The following examples were cured for three minutes at 180° C.

Example 14: Repeat of Example 2 with 180° C. cure.
Example 15: Repeat of Example 8 with 180° C. cure.
Example 16: Repeat of Example 11 with 180° C. cure.
Example 17: Repeat of Example 13 with 180° C. cure.

Test data is shown for these examples in Table 5.

TABLE 5

| | | | Tensile Strength, N/5 cm | | |
|---|---|---|---|---|---|
| Example | % Dicy | Accelerator (%) | Dry | Wet | % Retention |
| 14 | 5.0 | 0 (0) | 106 | 4 | 3.8 |
| 15 | 10.0 | 0 (0) | 108 | 18 | 16.7 |
| 16 | 5.0 | TFB (1.25%) | 103 | 34 | 33.0 |
| 17 | 5.0 | TFB (0.61) | 94 | 35 | 37.2 |

These data show that even low levels of accelerator help maintain a higher level of retention than with the dicy by itself, even at a high level.

EXAMPLE 18

Effect of Different Polyol

A binder with a different polyol, trimethylolpropane, was prepared as follows: 32.82 grams Polyacid A, 59.08 grams polyacid B, 4.91 grams trimethylolpropane, 1.87 grams dicyandiamide, 0.55 grams TFB, 17.87 grams Z-6040 (1.0%) and 219.65 grams water were blended and used to prepare a sheet as described in Example 1. The final sheet had 67 N/5 cm dry tensile, 38 N/5 cm wet tensile strength for a retention of 56.7%. This shows that a useful balance of properties can be achieved with different types of polyols.

EXAMPLE 19

Comparison to Triazinetrione

A triazinetrione [1,3,5-tris(2-hydroxyethyl)cyanuric acid)] (THEIC) (one of the preferred compounds in EP-B-

0672720) was evaluated on a different glass fiber than used for above examples. This glass was a one inch (2.5 cm) fiber and prepared at a nominal BW=1.6 lb/sq (78 g/m$^2$) and LOI=22%. Binders were prepared as follows:

TABLE 6

| Example | Polyacid A | TEA | THEIC | SHP | PTSA | Water |
|---|---|---|---|---|---|---|
| 19 | 78.28 | 11.0 | — | 2.22 | — | 164.32 |
| 20 | 78.28 | — | 19.36 | — | — | 202.36 |
| 21 | 78.28 | — | 19.36 | — | 1.08 | 208.39 |

Sheets were prepared as in Example 1. They were cured three minutes at 190° C. The THEIC system was also cured three minutes at 220° C. Test data is shown in Table 7:

TABLE 7

| Example | Cure Temperature, ° C. | Tensile Strength, N/5 cm | | |
|---|---|---|---|---|
| | | Dry | Wet | % Retention |
| 19 | 190 | 262 | 160 | 61.0 |
| 20 | 190 | 223 | 8 | 3.6 |
| 20 | 220 | 214 | 105 | 49.1 |
| 21 | 190 | 232 | 48 | 20.7 |

The results demonstrate low percentage retention of the THEIC system when cured at 190° C. but good percentage retention when cured at 220° C. By comparison, the results obtained in earlier examples indicate that good percentage retention can be achieved with dicy systems at 190° C. and dicy/accelerator systems at 180° C.

We claim:

1. A formaldehyde-free curable composition comprising:
   (a) a polyacid comprising at least two carboxylic acid groups, anhydride groups, or salts of the polyacid thereof;
   (b) an active hydrogen compound containing at least two active hydrogen groups selected from the group consisting of hydroxyl, primary amino, secondary amino, and mixtures thereof; and
   (c) one or more compounds selected from the group consisting of cyanamide, dicyandiamide, 1,2-mono- or di-($C_1$–$C_6$ alkyl) substituted-3-cyanoguanidines selected from ethyl-3-cyanoguanidine, 1,2-diethyl-3-cyanoguanidine, and 1,2-diisopropyl-3-cyanoguanidine, and 1,2-mono- or di-(C6–C12 aryl) substituted-3-cyanoguanidines, selected from phenyl-dicyandiamide; and, optionally
   (d) an accelerator;

wherein the ratio of the number of equivalents of said carboxylic acid groups, anhydride groups, or salts thereof to the number of equivalents of said active hydrogen groups is from 1/0.01 to about 1/3, and wherein said carboxylic acid groups, anhydride groups, or salts thereof are neutralized to an extent of less than 35% by weight with a fixed base.

2. A composition as claimed in claim 1, wherein component (c) is selected from cyanamide, dicyandiamide, and mixtures thereof.

3. A composition as claimed in claim 1, wherein the accelerator is selected from a phosphorus compound, a fluoroborate compound, and mixtures thereof.

4. A composition as claimed in claim 1, wherein the composition is an aqueous composition.

5. A composition as claimed in claim 1, wherein the composition is in the form selected from a dry powder and granules.

6. A composition as claimed in claim 1, wherein the composition comprises component (c) in an amount of from 3 to 8% by weight, based on the weight of components (a), (b) and (c).

7. A composition as claimed in claim 1, wherein the composition comprises component (d) in an amount of from 0.01 to 10% by weight, based upon the weight of components (a), (b) and (c).

8. A method for bonding heat-resistant fibers of a non-woven material comprising:
   (I) contacting said fibers with a formaldehyde-free curable composition as claimed in claim 1; and subsequently
   (II) heating the formaldehyde-free curable composition and fibers at from 120° C. to 300° C. for sufficient time to effect cure.

* * * * *